United States Patent [19]  [11] 4,147,840
Walsh et al.  [45] Apr. 3, 1979

[54] HALOGEN COMPLEXING HOMOTETRA-ALKYL SALTS FOR USE IN HALOGEN CELLS

[75] Inventors: Fraser M. Walsh, Arlington; Dennis N. Crouse, Melrose; Alfred M. Ajami, Boston, all of Mass.

[73] Assignee: Eco-Control, Inc., Cambridge, Mass.

[21] Appl. No.: 889,888

[22] Filed: Mar. 24, 1978

[51] Int. Cl.$^2$ .................................... H01M 10/36
[52] U.S. Cl. ................................ 429/50; 429/62; 429/198
[58] Field of Search ............ 429/50, 62, 198, 201

[56] References Cited

U.S. PATENT DOCUMENTS

| | | | |
|---|---|---|---|
| 3,816,177 | 6/1974 | Walsh | 429/201 |
| 4,038,459 | 7/1977 | Ajami et al. | 429/50 |
| 4,038,460 | 7/1977 | Walsh et al. | 429/50 |
| 4,065,601 | 12/1977 | Ajami et al. | 429/50 |

*Primary Examiner*—Donald L. Walton
*Attorney, Agent, or Firm*—Kenway & Jenney

[57] ABSTRACT

Homotetra-alkyl substituted quaternary ammonium salts, or mixtures thereof which crystallize at 30° C. or lower are included as an additive to the electrolyte of halogen cells. To maintain the salts as liquids, means for heating the additives to temperatures greater than 30° C. are included in the cell. The additives form complexes with elemental chlorine, bromine, iodine, or mixtures thereof in the electrolyte which complexes comprise predominantly electrolyte insoluble liquids at temperatures in excess of 30° C. The additives are characterized by rapid halogenation and dehalogenation while liquid; and thus, if maintained at temperatures in excess of 30° C., are well suited for halogen storage in battery or fuel cell applications.

8 Claims, 4 Drawing Figures

HALOGEN COMPLEXING HOMOTETRA-ALKYL SALTS FOR USE IN HALOGEN CELLS

BACKGROUND OF THE INVENTION

This invention relates to compounds useful for complexing halogens and more particularly to compounds useful as an electrolyte additive for electrochemical cells and batteries of the type which utilize a halogen as its electrochemically active agent.

Voltaic cells which include an aqueous solution of metal halide, e.g., cadmium or zinc halide, as an electrolyte are known, but are frequently characterized by a relatively high self-discharge rate, low capacity, and high internal resistance. Because elemental halogen is soluble in the aqueous electrolyte, it is difficult to keep metllic zinc or cadmium and elemental halogen apart while simultaneously achieving a system in which a good percentage of the theoretical energy storage capacity can be realized.

Various attempts have been made to prevent elemental halogen from migrating to the zinc or cadmium electrode. For example, U.S. Pat. Nos. 2,566,114 and 3,373,058 to M. R. Bloch teach the use of quaternary ammonium halides in zinc or cadmium halogen cells. However, the salts suggested for use in such cells exist as a crystalline material when complexed with halogen. While such crystalline quaternary ammonium halides are capable of reducing the concentration of dissolved halogen during cell charge and discharge, because of their crystalline nature, they are unable to rapidly complex and release halogen or to remain concentrated in the vicinity of the current collector during cell cycling.

U.S. Pat. No. 3,816,177 to M. A. Walsh teaches the use of soluble quaternary ammonium halides and the like which may be dissolved in the electrolyte together with a water soluble depolarizer. When elemental halogen is released into the electrolyte, it combines with the quaternary halide to form a quaternary polyhalide which in turn complexes with the depolarizer to form an insoluble, halogen rich, liquid complex. If an inert electrode made of a material which absorbs the insoluble complex is employed, an improved cell is provided because the liquid complex, being fluid, permits rapid diffusion of halogen during cell charge and discharge and because the complexed halogen molecules, being concentrated about the current collector, are available for electrochemical reaction to an improved degree. While this system represents a significant improvement over the use of crystalline quaternary polyhalides, it suffers from the requirement that the depolarizer, which cannot directly complex halogens, must be part of the liquid complex.

Further improvements in halogen electrochemical cells are disclosed in U.S. Pat. No. 4,038,459 to A. M. Ajami et al. entitled "Halogen Complexing Alcohols and Nitriles" and in U.S. Pat. No. 4,038,460 to F. M. Walsh et al. entitled "Halogen Complexing Ethers", both filed on Mar. 17, 1976. The watersoluble alcohols, ethers or nitriles disclosed in these applications form liquid polyhalides in the presence of elemental halogens or quaternary ammonium-halogen complexes which polyhalides are insoluble and halogen-rich. While cells and batteries containing these types of additives have certain advantages, these additives contribute significantly to the cost of cells containing them.

Another approach to the problem of improving the performance of halide cells is disclosed in U.S. Application Ser. No. 723,142, filed Sept. 14, 1976, by A. M. Ajami et al now Pat. No. 4,065,601. This application teaches the use of two phase electrolytes comprising an aqueous phase and a water immiscible organic phase. A halogen complexing organic salt such as an ammonium, pyridinum, sulfonium, or phosphonium salt is dissolved in the organic phase. This system depends on gravity separation of the phases of the electrolyte or on the ability of the halide electrode to absorb the organic phase.

A present concensus is that the use of liquid polyhalides in halogen cells constitute an improvement over the use of crystalline polyhalides. Liquid polyhalides are preferred because the halogen stored in the liquid polyhalide is more rapidly available for electrochemical reaction than would be the case if the polyhalide were stored in a crystalline matrix. Furthermore, liquid polyhalides can be transported to a separate storage location in the cell as they are formed electrochemically. From the storage location, the polyhalides can be rapidly returned and discharged at the bromine electrode or the polyhalide can be used to supply halogen to the electrolyte for discharge at the halogen electrode. This increased mobility of liquid polyhalides as compared to the crystalline polyhalides results in cells with increased storage capacity (through external storage), with improved electrode performance (through more rapid intraphase halogen transfer), and with increased ease in designing practical cells. Those skilled in the art recognize that cells which utilize liquid polyhalides can use electrode structures which are either porous or nonporous, which allow either halogen rich electrolyte or liquid polyhalide flow-by or flow-through, or which have the liquid polyhalide uniformly distributed on the halogen electrode surface by either physical or adsorption means.

Cells with crystalline polyhalides relay on their crystalline nature to maintain contact between the solid polyhalides and the halogen electrode. When such cells are in operation, nucleation sites on the halogen electrode provide a site for solid polyhalide crystal growth and adherence. However, even if the crystals are in close contact with the electrode, they cannot transfer halogen to or from the halogen electrode as rapidly as can a liquid polyhalide due to the decreased diffusivity of the halogen species in a crystalline polyhalide matrix compared to that in a liquid polyhalide matrix. Furthermore, certain cells utilizing crystalline polyhalides require a large powdered halogen electrode surface area against which to hold crystals. Such powdered electrode surfaces are not suitable for use with liquid polyhalides. Liquid polyhalides flow through the powdered electrode matrix during charge and poor halogen electrode performance is obtained during discharge because little of the powdered matrix is in intimate contact with the liquid polyhalide.

For proper operation, cells utilizing crystalline polyhalides must thus be maintained at temperatures less than the melting points of the crystalline polyhalides employed. Generally speaking, cells which utilize crystalline polyhalides, such as those disclosed in the Block patents, must be operated at a temperature less than 30° C. in order to maintain the crystalline nature of the polyhalides. In contradistinction to the foregoing, cells employing additives in accordance with the present invention must be maintained at temperatures greater than 30° C. in order to prevent the additives from crystallizing. During normal operation of the type of cell toward which the present invention is directed, the internal resistance of the cells during the charging cycle and the discharging cycle is normally sufficient to maintain the temperature of the additives at 30° or greater. However, during periods when the cell is neither being charged nor discharged, it is necessary to heat the polyhalides to a temperature of 30° or more to prevent the polyhalides from crystallizing. Thus, in addition to utilizing the polyhalide additives of the present invention, the present invention also includes a means for maintaining the temperature of the additives at 30° C. or higher to prevent their crystallization.

The instant invention constitutes a further improvement in the halogen cell art and provides seven compounds, one or more of which may be added to the electrolyte of halogen cells of the type described. The compounds of the invention eliminate the requirement of adding a depolarizer or other additional additive to the electrolyte yet provide increased halogen complexing ability if maintained at 30° C. or higher; and thus, enhance the shelf life and capacity of the cells and batteries in which they are used.

SUMMARY OF THE INVENTION

In general, the invention features compounds which may be added to the electrolyte of halogen cells or battery operated at temperatures greater than 30° C. Certain homotetra-alkyl quaternary ammonium salts, and mixtures thereof, rapidly and reversibly react with elemental halogen to form predominantly electrolyte insoluble liquid complexes in electrochemical systems when operated at temperatures greater than 30° C. Furthermore, these complexes exhibit a significantly improved stability in the electrochemical system in which they are used by resisting spontaneous halogenation and other deleterious side reactions.

Broadly, the compounds useful as additives in accordance with the invention are homotetra-alkyl quaternary ammonium salts where the alkyl groups have 1 to 7 carbon atoms and all alkyl groups about the nitrogen of the cation are equal. The additives of the invention form predominantely liquid complexes in the presence of one or more equivalents of halogen at temperatures greater than 30° C. and undergo rapid halogenation and dehalogenation.

In accordance with another aspect of the invention, an additive is provided which comprises two or more quaternary ammonium salts of the type described above having different homotetraalkyl substituents about the respective cationic sites and/or having different halide anions. Additives consisting of mixtures of this nature are preferred because, in accordance with known theory, the freezing point of the mixture is depressed. This means that the halogen complexes which result from such mixtures remain liquid at lower temperatures and may be rapidly dehalogenated over and increased temperature range. Those skilled in the art will appreciate that, for purposes of the invention, the lower melting the polyhalide mixture the better. Also, those skilled in the art will appreciate that operating an aqueous electrolyte electrochemical system at an elevated temperature is preferred in that it normally results in improved system voltaic performance.

Particular compounds useful as an additive in accordance with the invention include:

N,N,N,N-tetramethyl ammonium bromide;
N,N,N,N-tetraethyl ammonium bromide;
N,N,N,N-tetrapropyl ammonium bromide;
N,N,N,N-tetrabutyl ammonium bromide;
N,N,N,N-tetrapentyl ammonium bromide;
N,N,N,N-tetrahexyl ammonium bromide;
N,N,N,N-tetraheptyl ammonium bromide;
and mixtures thereof.

Accordingly, it is an object of the invention to provide additives for cells and batteries of the type described which are capable of greatly improving the performance of halogen utilizing electrochemical systems by rapidly complexing elemental halogen in the electrolyte.

Another object of the invention is to provide a number of compounds, one or more of which may be added to metal halide electrolytes to complex and hold chlorine, bromine, and/or iodine.

Another object of the invention is to provide a group of compounds capable of complexing halogens as halogen-rich liquids in electrochemical cells or batteries which obviates the necessity of adding additional substances such as depolarizers.

Still another object of the invention is to provide compounds which, when complexed with one or more molar equivalents of halogen, comprise chemically stable liquids which are substantially insoluble in aqueous halide solutions even at elevated temperatures and relatively high hydrogen ion concentrations, and which partition from the aqueous electrolyte to provide a source of halogen that may be readily utilized in halogen cells or batteries.

Yet another object of the invention is to provide compounds which, when complexed with one or more molar equivalents of halogen, comprise reasonable conductive liquids and therefore allow the halogens to undergo electrochemical reduction at the electrode of a halogen cell or battery at a reasonable rate.

Still another object of the invention is to provide compounds which, when complexed with one or more molar equivalents of halogen and when held at temperatures greater than 30° C., comprise liquids which can be pumped and stored indefinitely, thereby being suitable for use, directly or indirectly, as a source for halogen in a regenerative fuel cell or battery, and which do not structurally alter carbon electrodes or most halogen degradable plastics.

DESCRIPTION OF THE PREFERRED EMBODIMENT

Figure 1:
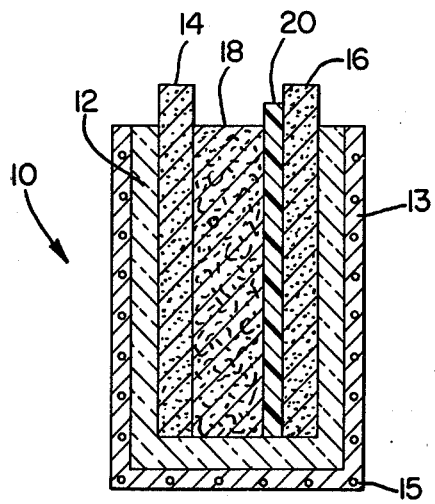
FIG. 1 is a cross-sectional view of a cell of the type with which the complexing compounds of the invention are useful.

At the outset, it is desirable to comment on certain terms that are used throughout this specification and claims. The terms "zinc electrode" and "bromine electrode" are not intended to imply that the electrodes are formed from these materials exclusively. As is conventional practice, these terms are used merely to indicate the electrochemically active element reacting. The metal and halogen electrodes of the cells with which the compounds of the present invention are employed, are electrochemically conductive and preferably porous. Carbon in its various forms is a preferred material. The carbon of the metal electrode serves as a plating surface for the reactive metal.

Furthermore, although reference is made to one counter electrode and one metal electrode, it is obvious that the compounds of the invention are useful in cells which include more than one pair of electrodes and with batteries of two or more cells constructed in accordance with methods known to those skilled in the art. Because cadmium, iron, titanium, chromium, and hydrogen are electrochemically similar to zinc, it is also obvious that the zinc of the electrode and the electrolyte can be replaced by these elements. In this regard it should also be noted that as used herein, metal electrode includes a hydrogen electrode of the type well-known in the art which utilizes an inert metal current collector. Although bromine is used throughout this specification and claims, it will be apparent to those skilled in the art that chlorine, iodine, or any combination of bromine, chlorine, and iodine may be substituted therefor. In fact, certain advantages accrue to the simultaneous use of two or more different halogens.

Although quaternary ammonium salts are extensively discussed herein, it should also be noted that phosphonium salts selected in accordance with the teachings set forth below will be the equivalent of the salts specifically set forth and may be used without departing from the spirit and scope of the invention.

During the discharge of the well-known zinc bromine cell, the following half reactions occur:

at cathode $Br_2 + 2e^- \rightarrow 2Br^-$
at anode $Zn^0 \rightarrow Zn^{++} + 2e^-$ On charging, the reactions are reversed:

at cathode $2Br^- \rightarrow Br_2 + 2e^-$
at anode $Zn^{++} + 2e^- \rightarrow Zn^0$ The zinc bromide of the electrolyte is thus consumed during charge and produced during discharge. In order for the cell to function properly, $Br_2$, which obviously must be present near the cathode when the cell is undergoing discharge, must somehow be stored. Since $Br_2$ is soluble in water containing solubilized metal halides, precautions must be taken to prevent it from migrating through the aqueous electrolyte and reacting directly with the metal at the anode. This goal has been achieved by incorporating a porous, conductive preferably carbon matrix of the type disclosed in U.S. Pat. No. 3,816,177 to M.A. Walsh, entitled "Secondary Cells and Batteries", the disclosure of which is incorporated herein by reference, and one or more of the compounds of the invention, into an otherwise conventional halogen cell. When the electrolyte containing a compound (additive) of the invention is absorbed into the porous electrode, elemental bromine produced during charging is complexed by the additive and prevented from solubilizing in the aqueous electrolyte.

The complexing compounds of this invention are substances having the following structural formula:

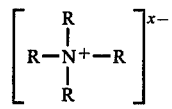

wherein $X^-$ is a counterion, preferably $Cl^=$, $I^-$, or $Br^-$, and R is an alkyl group having 1 to 7 carbon atoms. Salts of this character form halogen complexes which are known normally to be crystalline and to exhibit poor halogen and dehalogenation kinetics at temperatures less than 30° C. At temperatures greater than 30° C., especially as mixtures of one or more compounds of this invention, liquid halogen complexes can be obtained which exhibit rapid halogenation and dehalogenation kinetics and good conductivity.

The number of indistinguishable positions into which a homotetra-alkyl quaternary ammonium cation can be turned by simple rigid rotations (the symmetry number) appears to be 12 until thermally induced molecular deformations are taken into account. When these deformations are considered it is obvious that there will always be a temperature at which the average symmetry number of a given population of homotetra-alkyl cations will be less than or equal to 3.

There are three molecular deformations which lead to molecular dissymmetry: bond stretching and compression, bond angle bending, and bond torsion. Changing the bond angle, bond length or rotational confirmation of one of four equal alkyl groups on a homotetra-alkyl ammonium cation in relation to the other three will lower the symmetry number of the cation from 12 to 3. Each of the three molecular deformations have a force constant which is a measure of the energy required to effect the particular deformation. Since the energy imparted to the cations is related to the temperature of their environment a rise in temperature will always result in increased molecular deformations, decreased symmetry, and liquid polyhalide complexes.

Bond stretching and compression refers to the motion of bonded nuclei along the internuclear line. This deformation is governed by Hook's quadratic law where the energy ($V_s$) required to change the bond length (r) from its equilibrium position is proportional to the square of the linear displacement ($\Delta r$):

$$V_s = \tfrac{1}{2} K_s (\Delta r)^2$$

where $K_s$ is the bond stretching force constant. For single bonds $V_s \approx 350 \ (\Delta r)^2$ Kcal/mole/ $Å^2$.

Bond angle bending refers to the radical scissoring motion of the bond angle, and this deformation is also governed by a Hook's Law relationship:

$$V_B = \tfrac{1}{2} K_B (\Delta \theta)^2$$

where $\Delta \theta$ is the angular displacement from a equilibrium value, $K_B$ the bond bending force constant, and $V_B$ is the angle or Baeyer Strain. For deformations up to 20° of $sp^3$ bonds, $V_B \approx 0.01 \ (\Delta \theta)^2$ Kcal/mole/deg.$^2$.

Bond torsion refers to the rotational motion around the bond axis. The energy relationship for the C—N bond rotation in the tetramethyl ammonium cation can be written as:

$$V_R = \tfrac{1}{2} V_0 (1 + \cos 3\Delta\phi) \ \text{Kcal/mole}$$

where $\Delta \phi$ is the displacement of the dihedral angle, $V_0$ is the torsional energy barrier and $V_R$ is the torsional or Pitzer strain. The energy required to rotate from $V_R$min to $V_R$max is called the torsional energy barrier and is approximately equal to 3 Kcal/mole for the tetramethyl ammonium cation. The relationship between $V_R$ and $\Delta\phi$ becomes more complex for alkyl groups on the ammonium cation larger than methyl because of the larger number of possible torsional confirmations.

The total molecular strain energy ($V_T$) is the sum of the three strain energies associated with the three molecular deformations:

$$V_T = V_S + V_B + V_R$$

$V_T$ is therefore a function of the geometrical parameters r, $\theta$, and $\phi$ which define the molecular conformation. The magnitudes of these paramenters corresponds to the amount of deformation in a given cation and are dictated by the partitioning of $V_T$ among the component energy terms. Thus the soft bond angles of a cation will generally perform large scissoring motions whereas the stiff bond lengths will be less extensively deformed at a given temperature. The higher the temperature of the environment, the higher the probability that $V_T$ of a given cation will be large with a correspondingly large deformation and low symmetry number. This thermally induced decrease in symmetry results in a liquid phase of the cation-polyhalide complex.

All of the salts of the type set forth immediately above form polyhalides with one or more equivalent of halogen; the melting points of such polyhalides, or mixtures thereof, can be determined emperically and a particular quaternary ammonium polyhalide selected for use in a battery or fuel cell of a specified normal operating temperature.

In accordance with another aspect of the invention, a mixture of two or more homotetra-alkyl salts results in an additive having a polyhalide derivative with a lower freezing point and increased randomness as compared with the individual compounds included in the mixture. The phenomenon of freezing point depression is quantified by the expression $$\Delta T = [R\,(T_x)^2\,(mw_x)\,(m_y)]/1000\Delta Hfus_x \quad (1)$$

where $\Delta T$ is the freezing point depression of compound x (°K.), R is the gas constant, $T_x$ is the freezing point of pure x (°K.), $mw_x$ is the molecular weight of x, $m_y$ is the molality of compound y in x, and $\Delta Hfus_x$ is the heat of fusion of x. Equation 1 shows that as the molality of y in x is increased up to a 50:50 mixture, the freezing point depression of x increases. Where x and y are two different quaternary ammonium complexes at the same halogenation level, the freezing points of both will be depressed when mixed together. Since equation 1 limits $\Delta T$ to physical parameters which can be varied only slightly, it is important that $T_x$ be as low as possible. It should also be noted that the symmetry and freezing points of additives and complexes of the invention are also lowered if mixtures of bromide, chloride, and/or iodide salts are employed, even if only one quaternary cation is used.

It is desirable but not critical that the compound or compounds used as a complexing additive, prior to complexing, be soluble in the zinc halide electrolyte of the cell. Those skilled in the art recognize that operating the cell at increased temperature results in increased compound solubility in the electrolyte. Also the compound should be as stable as possible, thus resisting chemical breakdown and bromination under the conditions which obtain in the cell. Thus, the compounds of the invention are homotetra-alkyl quaternary ammoniums wherein the alkyl chain contains one to seven carbon atoms. Preferred additives include but are not limited to compounds such as N,N,N,N,-tetramethyl ammonium bromide, N,N,N,N-tetraethyl ammonium bromide, N,N,N,N-tetrapropyl ammonium bromide and N,N,N,N-tetrabutyl ammonium bromide, and mixtures thereof. These additives are preferred because their liquid polyhalides are generally more dense than the aqueous zinc halide electrolyte of the cell.

Methods of synthesizing compounds of the type described above are generally well-known in the art; see, for example, J. Goerdeler in Houben-Weyl, Methoden der organischen Chemie, Bd. XI/2, p. 587; Georg Thieme Verlag, Stuttgart 1958. The procedure may be summarized as follows:

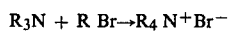

wherein R is an alkyl. Various modification, well-known to those skilled in the art, can produce a wide variety of the types of compounds disclosed above. One successful compound has been prepared as follows:

In a 100 ml round bottom flask fitted with a dry ice acetone reflux condenser, 250 mmole of N,N,N-trimethylamine in 50 ml methanol is stirred and cooled; 260 mmole of methyl bromide (chilled) is added dropwise. The solvent and excess reagents are removed and the solid residue is crystallized from isopropanol yielding 34.6 g (90%) of a white crystalline quaternary ammonium bromide according to the reaction:

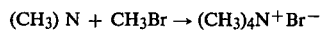

Referring to FIG. 1, a cell 10 of the type in which additives of the invention are useful is shown. The cell comprises a case 12 which incorporates a mechanism for maintaining the cell at a temperature greater than 30° C., a pair of graphite electrodes 14, 16, a graphite-felt mass 18, and a porous polymeric separator 20. Those skilled in the art will recognize that a number of methods can be used to maintain the cell 10 at a temperature greater than 30° C. and that these methods generally include an insulating layer 13 encasing the cell 10 which includes a heating element such as a wire coil 15. When a small amount of current is passed throughout the wire coil 15, heat is liberated due to the resistance of the wire; such heat raises the temperature of the cell 10. By properly varying the current passing through the wire coil 15, a constant cell 10 temperature greater than 30° C. can be obtained which can be efficiently maintained because of the insulating layer 13. Other methods to maintain cell temperature include holding the cell 10 in a heated environment such as an oven or a heating bath or by heating the cell 10 using an external heating device such as a hot air source. Those skilled in the art will also recognize that the insulating layer 13 is required only for energy efficient maintainance of the cell temperature (e.g., the cell can be maintained at temperatures greater than 30° C. in the absence of the insulating layer 13 by increasing the current passed through the wire coil 15). Graphite electrode 14 acts as the bromide electrode; electrode 16 acts as the metal electrode for formation of zinc, cadmium, iron, titanium, chromium or hydrogen. Electric leads (not shown) are connected to the electrodes by means of clips. Electrodes 14, 16 have a porosity of 26%. A suitable graphite felt is available commercially from Union Carbide Corporation (VWF grade), and a suitable cell separator may be purchased from W. R. Grace, Inc. under the trade name DARAMIC.

Figure 4:
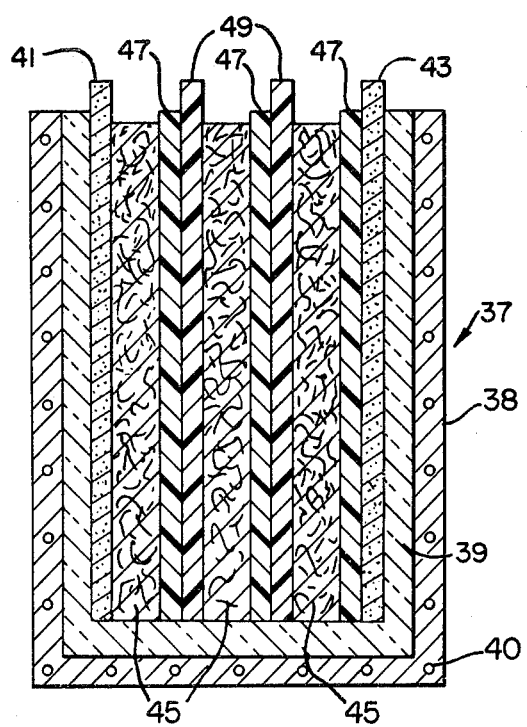
FIG. 4 is a cross-sectional view of a battery of the type with which the complexing compounds of the invention are useful.

FIG. 4 depicts a bipolar, multicelled battery 37 of the type which utilizes the additive of the invention. It comprises a glass, water-tight case 39 which is inturn encased in an insulating layer 38 which includes a heating element 40 to keep the battery 37 at a temperature greater than 30° C., and which case 39 encloses a pair of graphite plate current collectors. Plate 43 serves as a metal electrode. Interposed between the current collectors 41, 43 is an array of graphite felt masses 45 which serve as counter electrodes. A porous polymeric separator 47 (Dramic, approximately 0.125 in. thick) and a bipolar electrode 49 (conductive polymer film made by conductive Polymer Corporation, Marblehead, Mass., approximately 0.020 in thick) are in turn interposed between each graphite felt mass 45. The number of cells in the battery, of course, may be increased or decreased as desired.

The electrolyte of the above-described electrochemical system, which is contained in the felt masses, comprises aqueous solutions of inorganic salts, such as zinc halide or cadmium halide, up to 50% of one of the additives described above, and may include 0 to 30% of one or more of various well-known additives for improved plating.

To demonstrate the effect of the compounds of the invention, a cell with a stationary electrolyte as described above was heated at 50° C. and was charged until more than 80% of the zinc halide initially in solution was converted into zinc and halogen. Charging current densities ranged typically from 5 to 25 amperes per square foot. All cells were tested at a constant current drain for a variety of current densities.

Figure 2:
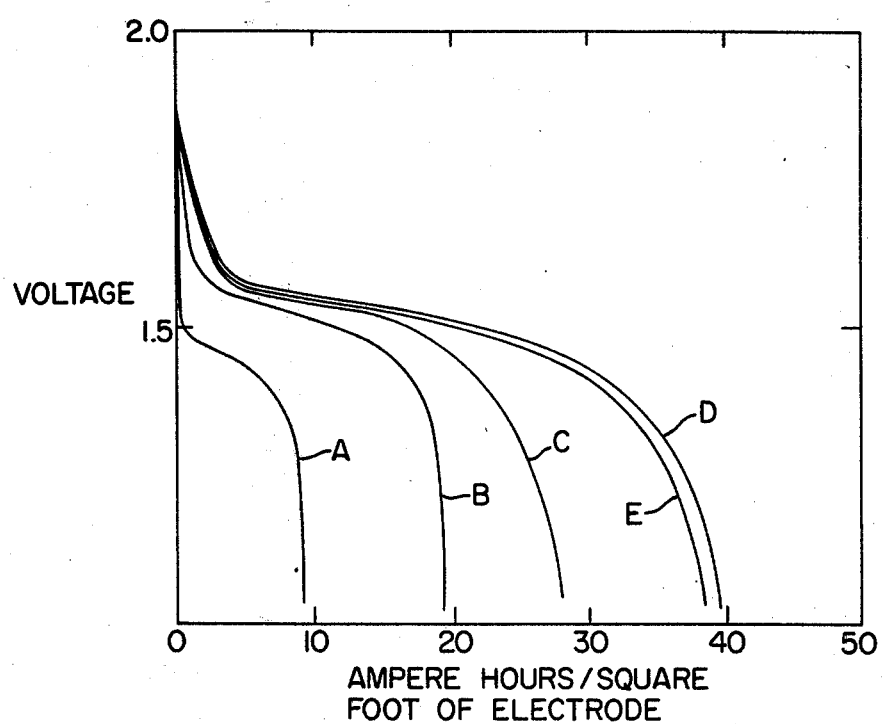
FIG. 2 is a graph of voltage vs. ampere hours/square foot of electrode surface which illustrates the improved storage capacity of cells constructed in accordance with FIG. 1 when a complexing compound of the invention is added to the electrolyte.

Data obtained from these tests are summarized in FIG. 2. The curves were obtained by measuring ampere hours of current output, at various voltages, for cells with a stationary electrolyte which had been charged as described above. For the curve labeled A, the electrolyte consisted of 1.5 M $ZnBr_2$ and 0.2 M $ZnSO_4$ in water at 25° C. For B, the electrolyte consisted of 1.5 M $ZnBr_2$ and 0.2 M $ZnSO_4$ in water at 50° C. For C, the electrolyte consisted of 1.5 M $ZnBr_2$, 0.2 M $ZnSO_4$, 0.2 M N,N,N,N-tetramethyl ammonium bromide and 0.2 M N,N,N,N-tetraethyl ammonium bromide in water at 25° C. The electrolyte of D comprised 1.5 M $ZnBr_2$, 0.2 M $ZnSO_4$, 0.2 M N,N,N,N-tetramethyl ammonium bromide and 0.2 M N,N,N,N-tetraethyl ammonium bromide at 50° C. in water, that is one of the mixtures of halogen complexing compounds of the invention at a preferred cell operating temperature. The electrolyte of E comprised 1.5 M $ZnBr_2$, 0.2 M $ZnSO_4$, 0.2 M N,N,N,N-tetramethyl ammonium bromide at 45° C. in water, that is one of the compounds of the invention operating at a preferred cell operating temperature. These curves demonstrate that a significantly greater number of ampere hours may be obtained from a cell whose electrolyte contains an additive of the invention at a preferred temperature, and that the compounds of the invention, when added to the electrolyte, increase cell capacity.

Figure 3:
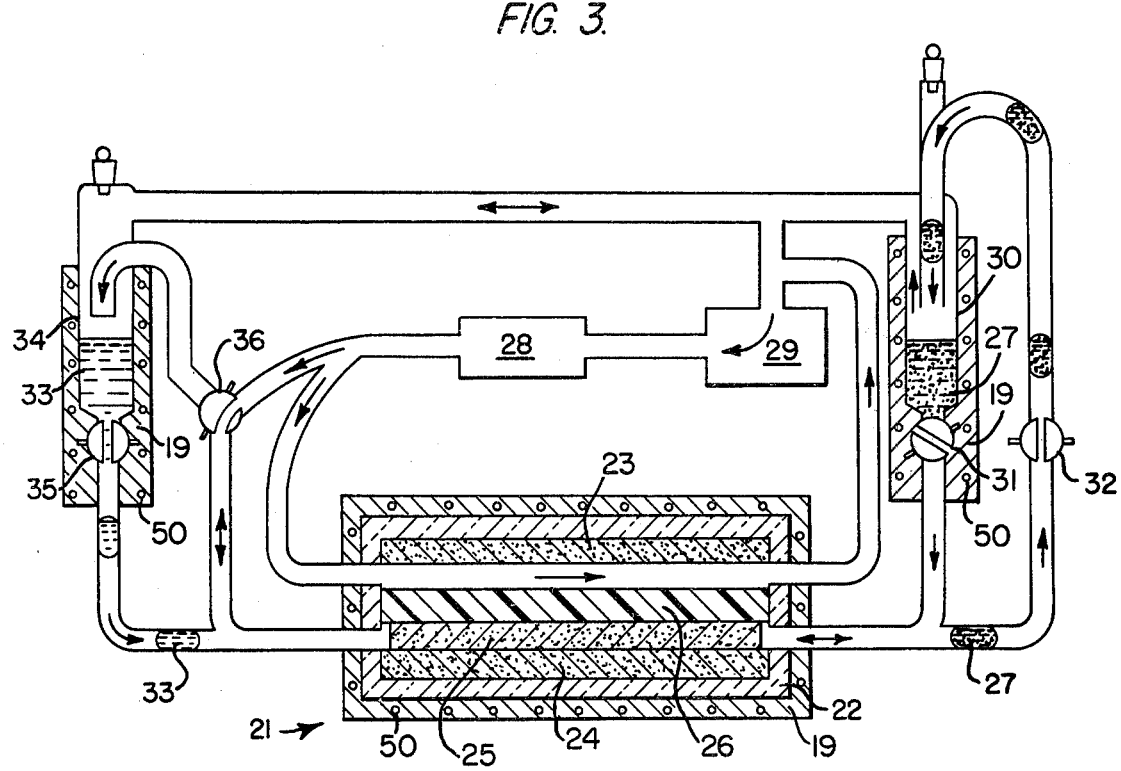
FIG. 3 is a schematic representation of a regenerative fuel cell with a recirculating electrolyte in which the complexing compounds of the invention are useful.

Referring to FIG. 3, a cell 21 is shown which utilizes a recirculating electrolyte containing a halogen complexing additive of the invention. The cell 21 comprises a case 22, a pair of graphite electrodes 23, 24, a graphite felt mass 25, and a porous polymeric separator 26. The equipment for storing the halogen complex 27 and providing fresh electrolyte, comprises a pump 28, an electrolyte reservoir 29, a halogen complex reservoir 30, and a pair of valves 31 and 32 for storing and releasing the halogen complex 27. During charging through terminals attached to electrodes 23 and 24 (not shown), the halogen complex 27 is formed in the felt 25 from either a water soluble or water insoluble additive of the present invention, i.e., liberated $Br_2$ combined as disclosed above to form a $Br_2$ complex. The electrolyte of the cell 21 is maintained at a temperature greater than 30° C. using a heating element such as a wire coil 50 in an insulating layer 19 encasing either the cell 21 or the halogen complex reservoir 30 or both. Maintaining the electrolyte at a temperture greater than 30°A C. results in maintaining the halogen complex 27 liquid throughout cell 21 charge and discharge. The electrolyte insoluble liquid halogen complex 27 is pumped to the reservoir 30, where, by opening valve 31 it can be drained back into felt 25 for consumption during discharge. The metal is plated out on electrode 23 during charge with the quality of the plate and plating characteristics dependent inter alia, on flow rate. When a water insoluble additive 33 is employed, a storage reservoir 34, which is held at a temperature greater than 30° C. by a heating element such as a wire coil 50 in an insulating layer 19, and a pair of valves 35 and 36 may be included for storing and releasing the alkyl additive 33. This cell can also be operated using the halogen released from the halogen complex where such halogen is either passed through a porous carbon or protected titanium electrode or passed by a solid carbon or protected titanium electrode. Those skilled in the art recognize that a spinel coating containing ruthenium oxide can serve to protect titanium from direct reaction with halogens. The electrolyte of the cell comprises inorganic salts, such as zinc halide or cadmium halide, up to 50% of one or more of the compounds of the invention, and may include 0 to 30% of one or more of the various well known additives for improving plating characteristics. The electrolyte can be held at a temperature greater than 30° C. by one of a number of means known to those skilled in that art other than the wire coil 50 and the insulating layer 19 described. Such other means include holding the cell in a heated environment such as an oven or heating bath or by heating the cell 21 using an external heating device such as a hot air source. Those skilled in the art will appreciate that complex 27 may be used to drive cells other than the one illustrated in FIG. 3. For example in addition to zinc and cadmium cells, the complexes will be useful in other halogen utilizing cells which may employ, for example, iron, titanium, chromium, or hydrogen as an anode.

The purpose of heating the cell is to maintain the cell environment at a temperature at which the electrolyte insoluble liquid halogen complex will always remain liquid independent of the bromination level of the halogen complex. In the absence of heating, the halogen complex can be crystalline depending on bromination level and thereby would not permit the rapid bromine diffusion to the bromine electrode required for high bromine electrode performance and would not permit the ease in mobility of the halogen complex in the cell required for efficient cell operation when a recirculating electrolyte is employed. Such heating is not required if the cell is always operated in environments of temperature greater than the melting point of all the bromination levels of the halogen complex. It is obvious to those skilled in the art that preferred operating environments are those in which a minimum of heating is required.

To demonstrate the effect of the compounds of the invention, a cell with a recirculating electrolyte as described above containing N,N,N,N-tetramethyl ammonium bromide and N,N,N,N-tetrabutyl ammonium bromide was charged at current densities ranging from 10 to 60 amperes per square foot for periods of time ranging from 1 to 3 hours. The electrolyte of the cell was maintained at 45° C. by heating the electrolyte reservoir using an oil-bath. The cell was tested at a constant current drain for a variety of current densities and was demonstrated to have a coulombic efficiency of 60 to 90% and an energy efficiency of 50 to 70%. Without an additive of the present invention in the electrolyte, no halogen complex 27 is formed, and the bromine, which dissolves in the electrolyte, reacts with the zinc plate on electrode 23 resulting in a coulombic and energy efficiency of less than 10%.

Table I illustrates that the halogen complexing property holds for a representative cross-section of the class of compounds of the invention. The data in the table were obtained by mixing 3 mM of bromine in a flask containing 3 ml of 2M $ZnBr_2$, and 1 mmole of the complexing compound at 45° C. Partitioning of the bromine complex and the aqueous phase was achieved by vigorous stirring. Stirring for 18 hours under these conditions was shown to yield identical results. The bromine complex and aqueous phases were then separated by centrifugation and the aqueous phase was titrated for bromine.

Table I

| Complexing Compound | % Br Remaining in aqueous phase |
|---|---|
| 1) QmBr Sulfolane (250 mg) | 27 |
| 2) O Br-1 | 19 |
| 3) CN Br-1 | 25 |
| 4) OH Br-1 | 27 |
| 5) ECO-2 | 8 |
| 6) ECO-3 | 14 |
| 7) ECO-4 | 11 |
| 8) ECO-5 | 12 |

In the foregoing table,
QmBr: is phenyl trimethyl ammonium bromide
Sulfolane: is tetramethylene sulfone
O Br-1: is N,N,N-triethyl-N-ethoxy-ethylene ammonium bromide
CN Br-1: is N,N,N-triethyl-N-2-cyanoethyl ammonium bromide
OH Br-1: is N,N,N-triethyl-N-3-hydroxy propyl ammonium bromide
ECO-1: is N,N,N,N-tetramethyl ammonium bromide
ECO-2: is N,N,N,N-tetraethyl ammonium bromide
ECO-3: is N,N,N,N-tetrapropyl ammonium bromide
ECO-4: is N,N,N,N-tetra-butyl ammonium bromide
ECO-5: is a 1:1 molar mixture of ECO-1 and ECO-2

As can be seen from a study of Table I, the homotetraalkyl compounds of the invention (examples 5–8) complex a greater percentage of the available bromine as liquid polyhalides than the quaternary ammonium salt-aprotic dipole (sulfolane) system of example 1, or the ether, nitrile or alcohol group containing compounds of examples 2–4.

Table II, set forth below, illustrates the melting points of the alkyls of the invention, as represented by the 4 embodiments set forth above (ECO-1 – ECO-4), at four useful bromination levels.

Table II

| Complexing Compound | Bromination Level | | | |
|---|---|---|---|---|
| | $Br_3$ | $Br_5$ | $Br_7$ | $Br_9$ |
| | Melting Point, ° C. | | | |
| ECO-1 | 30 | 25 | 31 | 43 |
| ECO-2 | 33 | 48 | 40 | 47 |
| ECO-3 | 82 | 49 | 37 | 42 |
| ECO-4 | 57 | 28 | 28 | 25 |

The data in Table II were obtained by mixing the amount of bromine required to form the disclosed bromination level in a test tube containing 1 mmole of the complexing agent in 3 ml of 2 M $ZnBr_2$. The solution was frozen and thawed to induce initial crystallization and then heated to melt the solid. The temperature at which the polyhalide recrystallized was recorded (± 2° C.).

Table 3 illustrates that mixtures of the homotetraalkyl compounds of the invention provide polyhalides which may melt at a lower temperature than the corresponding compounds by themselves. Mixtures of homotetraalkyl ammonium bromides are a preferred embodiment of the invention in that they permit cell operation over a wider temperature range.

Table III

| Complexing Compound | Melting Point, ° C. |
|---|---|
| ECO 2 | 48 |
| ECO 3 | 49 |
| ECO 2 + ECO 3 | 30 | where
ECO-2 is N,N,N,N-tetraethyl ammonium bromide
ECO-3 is N,N,N,N-tetrapropyl ammonium bromide The data in Table 3 were obtained by mixing 2 molar equivalents of bromine in a test tube containing 1 mmole of each of the complexing agents in 3 ml of 2 M $ZnBr_2$. The solution was frozen and thawed to induce crystallization and then heated to melt the solid. The temperature at which the polyhalide recrystallized was recorded (± 2° C.). The organic salts used to perform the tests described in Tables II and III were commercially obtained from Eastman Chemical Co. and were of commercial grade purity. The observed crystallization points may be affected by the presence of contaminants in such materials.

Table IV illustrated that the homotetra-alkyl compounds of the invention are more stable at elevated temperature than are corresponding ether or alcohol functionalized complexing compounds.

Table IV

| Stability at 50° C. in 2 M $ZnBr_2$ as the Pentabromide | | |
|---|---|---|
| Complexing Compound | pH | |
| | initially | after 16 hrs. |
| ECO-2 | | |
| ECO-4 | 4.1 | 4.1 |
| DMBr | 4.4 | 1.8 |
| Choline Bromide | 3.8 | 1.0 | where
DMBr is N,N-dimethyl morpholinium bromide
Choline Bromide is N,N,N,-trimethyl-N-hydroxyethyl ammonium bromide The data in Table IV were obtained by holding at 50° C. capped test tubes containing 2.5 mmoles of the complexing compound in 5 ml of 2M $ZnBr_2$ with 5 mmoles of bromine. The pH of the zinc bromide phase was monitored. A decrease in pH is indicative of the formation of HBr from compound degradation. The solutions are initially weakly acidic due to the Lewis acid strength of the zinc species. These data illustrate the significantly increased temperature stability of the homotetra-alkyls in the presence of free halogens and hydrogen ion.

Table V illustrates that the alkyl compounds of the invention are more stable in the presence of acid at elevated temperatures than is the corresponding nitrile functionalized complexing compounds.

Table V

| Stability at 80° C. in 0.1 M $D_2SO_4/D_2O$ | | |
| --- | --- | --- |
| Complexing Compound | After 24 hrs. | After 76 hrs. |
| 1) ECO-2 | Stable | Stable |
| 2) ECO-4 | Stable | Stable |
| 3) CN Br-2 | Stable | Decomposed |
| 4) CN Br-3 | Stable | Decomposed |

Where:
ECO-2: is N,N,N,N-tetraethyl ammonium bromide
ECO-4: is N,N,N,N-tetrabutyl ammonium bromide
CN Br-2: is N-2-cyanoethyl-N,N-diethyl-N-methyl ammonium bromide
CN Br-3: is N-3-cyanopropyl-N,N,N-triethyl ammonium bromide.

The data in Table 4 was obtained by holding at 80° C. capped NMR tubes containing 0.01 mmole of the complexing compound in 1 ml of deuterated 0.1 M deuterated sulfuric acid. Decomposition was determined by chemical shifts in protons by nuclear magnetic resonance spectroscopy. A chemical shift was observed for the nitriles due to hydrolysis of the nitrile.

The invention may be embodied in other specific forms without departing from the spirit or essential characterization thereof; the present embodiments are therefore to be considered in all cases as illustrative and not restrictive, the scope of the invention being indicated by the appended claims rather than by the foregoing description, and all changes which come within the meaning and range of equivalency of the claims are therefore intended to be embraced therein.

We claim:

1. A process for improving the performance of current delivering electrochemical systems of the type which utilize a substance selected from the group consisting of bromine, chlorine, iodine, and mixtures thereof as their electrochemically active agent, said process comprising: adding to the electrolyte of said system, at least one halogen complexing additive, said additive being selected from the group consisting of homotetra-alkyl ($C_1$–$C_7$) quaternary ammonium salts and a halide counterion; and,
    maintaining the temperatures of the additive when complexed with halogen at temperatures in excess of 30° C. and sufficient to prevent the complexed additive from crystallizing and thus enable the complexed additive to exist in the cell as an insoluble liquid.

2. The process as set forth in claim 1 wherein at least two halogen complexing compounds having different homotetra-alkyl substituents are employed.

3. The process as set forth in claim 1 wherein at least two halogen complexing compounds having different halide anions are employed.

4. The process as set forth in claim 1 wherein the additive is a compound selected from the group consisting of:
    N,N,N,N-tetramethyl ammonium bromide
    N,N,N,N-tetraethyl ammonium bromide
    N,N,N,N-tetrapropyl ammonium bromide
    N,N,N,N-tetrabutyl ammonium bromide
    N,N,N,N-tetrapentyl ammonium bromide
    N,N,N,N-tetrahexyl ammonium bromide
    N,N,N,N-tetraheptyl ammonium bromide
    and mixtures thereof.

5. An electrochemical cell comprising a case, a porous, conductive halogen electrode, an Me electrode where Me is selected from the group consisting of zinc and cadmium, an aqueous electrolyte containing an inorganic salt of the formula MX, where M is selected from the group consisting of cadmium and zinc and X is selected from the group consisting of bromide, chloride, iodide, or mixtures thereof, at least one halogen complexing additive, said additive being selected from the group consisting of homotetra-alkyl ($C_1$–$C_7$) quaternary ammonium salts and a halide counterion; and,
    means for maintaining the temperatures of the additive when complexed with halogen at temperatures in excess of 30° C. and sufficient to prevent the complexed additive from crystallizing and thus enable the complexed additive to exist in the cell as an insoluble liquid.

6. The cell as set forth in claim 5 including at least two halogen complexing compounds having different homotetra-alkyl substituents.

7. The cell as set forth in claim 5 including at least two halogen complexing additives having different halide anions.

8. The cell as set forth in claim 5 wherein the additive is a compound selected from the group consisting of:
    N,N,N,N-tetramethyl ammonium bromide
    N,N,N,N-tetraethyl ammonium bromide
    N,N,N,N-tetrapropyl ammonium bromide
    N,N,N,N-tetrabutyl ammonium bromide
    N,N,N,N-tetrapentyl ammonium bromide
    N,N,N,N-tetrahexyl ammonium bromide
    N,N,N,N-tetraheptyl ammonium bromide
    and mixtures thereof.

* * * * *

UNITED STATES PATENT AND TRADEMARK OFFICE
CERTIFICATE OF CORRECTION

PATENT NO. : 4,147,840
DATED : April 3, 1979
INVENTOR(S) : Fraser M. Walsh, Dennis N. Crouse and Alfred M. Ajami It is certified that error appears in the above-identified patent and that said Letters Patent are hereby corrected as shown below:

Column 2, line 37, change "relay" to --rely--

Column 6, line 7, change "Cl=" to --$Cl^-$--

Column 10, line 11, change "30°AC." to --30°C.--

Column 12, line 53, insert --4.2-- and --4.2-- after ECO-2 and move initially and after 16 hrs. up to line 52

Signed and Sealed this

Twenty-fifth Day of September 1979

[SEAL]

Attest:

LUTRELLE F. PARKER

Attesting Officer    Acting Commissioner of Patents and Trademarks